Feb. 17, 1925.

P. FISCHBACH

SHACKLE

Filed Aug. 21, 1922

1,526,632

Inventor-
Paul Fischbach
By
B. Singer, Atty.

Patented Feb. 17, 1925.

1,526,632

UNITED STATES PATENT OFFICE.

PAUL FISCHBACH, OF GISBORNE, NEW ZEALAND.

SHACKLE.

Application filed August 21, 1922. Serial No. 583,330.

*To all whom it may concern:*

Be it known that I, PAUL FISCHBACH, subject of the King of Great Britain, residing at 472 Gladstone Road, Gisborne, in the Dominion of New Zealand, have invented new and useful Improvements in or Relating to Shackles, of which the following is a specification.

This invention relates to shackles of all classes and particularly to that type of shackle employed in pivotally connecting or hinging any two members together, in which the two members are journalled to rotate or swing one within the other.

The invention has been devised with the object of providing a construction of journal bearing for use in such appliances, by means of which the width of the bearing may be adjusted to varying widths whenever required, the wear thereon is reduced, and may be quickly taken up whenever needed so as to prevent any looseness, and in which provision is made for the effective lubrication of the joint.

The improved construction has been devised specially for embodiment in the construction and fitting of the shackles used in the suspension of vehicle bodies, as motor vehicles, upon their springs, but it may be adapted for a large number of other analogous uses in which a journal hinge or pivot is required, as for instance, in power transmission devices, connecting rods, driving chains and the like.

The essential feature of the invention consists in constructing the journal core, or trunnion, in two parts, each formed by a block fixed to a side plate and made with a coned surface, which two parts are disposed opposite to one another so that the two blocks extend inwards with the smaller ends adjacent, and are then fastened together by a bolt that passes loosely through one block and is screw threaded through the other, and is furnished with a lock nut. This permits of the two parts being moved in or out in relation to one another so as to vary the distance between them and then locked at the required distance apart. The second member of the hinge joint is provided with a bush, or is formed with an eye, to encircle the two cone blocks and to bear thereon, so that by the adjustment of the blocks in their distance apart, the fit of the bearing may be regulated inside the bush or eye and any slackness taken up at will.

The provision for lubricating the bearing is obtained by forming the tie bolt with a bore extending centrally in from its head end and then opening radially from the bolt at a point between the cone blocks. A lubricator is fitted into or onto the outer end of the bore and thus provides for the supply of the lubricant to the surfaces between the bearing blocks and the bush or eye.

This construction is illustrated in the accompanying drawings, in which:—

Figure 1:
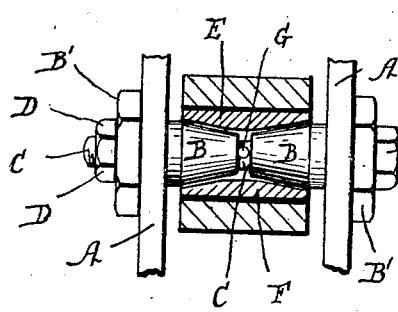
Figure 1 is an elevation of a joint formed in accordance herewith, the outer, or female, member thereof being shewn in section.
Figure 2:
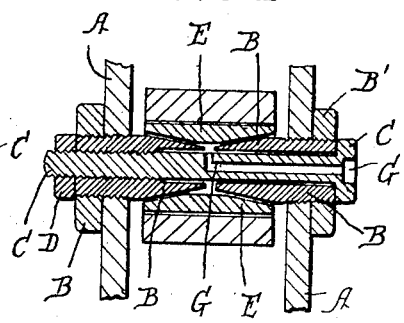
Figure 2 is a similar view but with the whole joint shewn in section.
Figure 3:
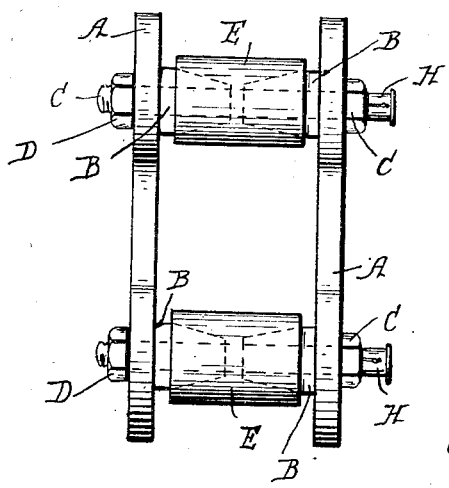
Figure 3 is a front elevation.
Figure 4:
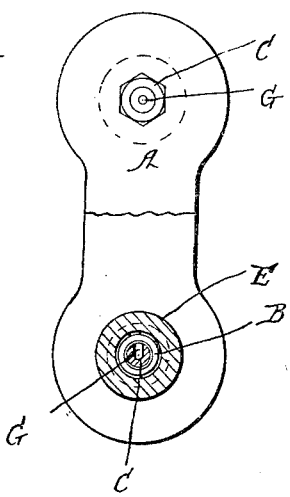
Figure 4 is a side elevation of a spring, or like, shackle made in accordance with the invention.

The invention is applicable to a single hinge shackle fitting as shewn in Figures 1 and 2 or to the double hinge shackle as shewn in Figures 3 and 4. In either instance the construction of each hinge unit of the shackle is the same.

Each hinge joint is made up of the usual male, or trunnion, member and the usual female, or sleeve member fitted to turn one upon or within the other. In this invention the trunnion member is formed of two parts, each consisting in a side plate A and a block B fixed to the inside of such plate so as to extend inwards in an axial plane with the other block, and a bolt C passing through both side plates and axially through both blocks. The said block B may be made integrally with its side plate as shewn in Figure 3 or it may be made separate therefrom and fixed in it by screwing through the plate and then being locked by the lock nut B' screwed on to its outer end and engaging the outside of the plate, as shewn in Figures 1 and 2. In all cases, however, the block is made of cylindrical form with a diameter decreasing regularly in cone fashion towards its inner end from a short distance away from the plate's inner surface, as shewn clearly in Figure 1. Cone bearing surfaces are thus provided by the two blocks, the surfaces tapering respectively inwards towards the centre.

The bore through one part of the trunnion member is made plain, while through the other it is formed with a female screw thread. The bolt C is made to pass freely in through the first part and then to screw in its end through the other part so that it projects beyond the outer side of the plate thereof. Thus by turning the bolt, the width between the side plates and of the bearings formed by the cone blocks between them may be varied at will. A nut D is provided for screwing upon the bolt end to lock the bolt in the manner hereinafter described.

The outer, or female, member of the hinge joint is provided with a bearing bush E, or sleeve, or with its bearing eye, made with an internal diameter tapering inwards from both ends in correspondence with the taper of the two cone blocks B, so that when such blocks are respectively passed in from the opposite ends of the bush, they will fit the surface thereof in the manner shewn in Figures 1 and 2. Then, by screwing in the bolt C the blocks B may be drawn inwards into the bush ends, or moved outwards to provide the neat fitting of the bearing surfaces with the requisite clearance of freedom for the hinging or turning of the joint. The screwing up of the nut D will then lock the bolt against any turning.

The exact adjustment of the bearing may thus be obtained by the operation of the bolt C, and if any wear occurs in the members of the bearing the looseness caused thereby may be readily taken up, by loosening the nut D and then screwing the bolt inwards to bring the cone blocks closer together. The central portion of the bore in the bush E is made of uniform diameter so that there may be freedom of movement for the inner ends of the cones and also to provide a lubricating chamber F (Figure 1) between the block ends.

The bolt C, as shewn, is formed with the bore G made to extend axially through it from its head end and then to emerge radially at a point that is positioned between the inner ends of the block B. This bore at its outer end is fitted with any approved lubricant cup, as the cups H shewn in Figures 3, so that a supply of lubricant to feed along the bore into the chamber F, and thence in between the surfaces of the cones and bush, may be provided for.

I claim:

A shackle bolt bearing comprising two side plates arranged in spaced relation, a cone shaped block screwed directly to and projecting from the rear side of each side plate, said blocks operating in alinement with each other, one of said blocks having a plain axial bore and the other having a threaded bore, a bolt passing freely through the plain bore and engaging the threaded bore and other means having a double conical bore engaged by said blocks, and a lock nut on the other end of each block and bearing against one of the side plates.

In testimony whereof I affix my signature.

PAUL FISCHBACH.